US 6,676,311 B2
Jan. 13, 2004

(12) United States Patent
Benger

(10) Patent No.: US 6,676,311 B2
(45) Date of Patent: Jan. 13, 2004

(54) METHOD FOR CREATING A WORK OF FINE ART THAT IS A COMPOSITE OF TWO WORKS OF FINE ART

(76) Inventor: Brent Benger, 5335 E. Shea Blvd., #2050, Scottsdale, AZ (US) 85254

( * ) Notice: Subject to any disclaimer, the term of this patent is extended or adjusted under 35 U.S.C. 154(b) by 0 days.

(21) Appl. No.: 10/459,059

(22) Filed: Jun. 11, 2003

(65) Prior Publication Data

US 2003/0210940 A1 Nov. 13, 2003

Related U.S. Application Data

(63) Continuation-in-part of application No. 09/649,941, filed on Aug. 29, 2000, now Pat. No. 6,604,873.

(51) Int. Cl.[7] ............................................. B41J 11/44
(52) U.S. Cl. ............................. 400/76; 400/61; 400/70
(58) Field of Search ............................. 400/61, 70, 76; 358/1.18, 444

(56) References Cited

U.S. PATENT DOCUMENTS

| | | | | |
|---|---|---|---|---|
| 5,109,281 A | * | 4/1992 | Kobori et al. | 358/296 |
| 5,307,452 A | * | 4/1994 | Hahn et al. | 345/592 |
| 5,411,557 A | * | 5/1995 | Terada | 8/444 |
| 5,459,819 A | * | 10/1995 | Watkins et al. | 358/1.18 |
| 5,508,084 A | * | 4/1996 | Reeves et al. | 428/172 |
| 5,815,645 A | * | 9/1998 | Fredlund et al. | 358/1.18 |
| 5,867,282 A | * | 2/1999 | Fredlund et al. | 358/450 |
| 5,963,214 A | * | 10/1999 | Cok et al. | 345/630 |
| 5,986,671 A | * | 11/1999 | Fredlund et al. | 345/629 |
| 6,295,370 B1 | * | 9/2001 | D'Hooge | 382/162 |
| 2002/0118209 A1 | * | 8/2002 | Hylen | 345/582 |
| 2002/0118891 A1 | * | 8/2002 | Rudd et al. | 382/282 |

FOREIGN PATENT DOCUMENTS

| | | | | | |
|---|---|---|---|---|---|
| CN | 1305903 A | * | 8/2001 | | B44C/3/08 |
| JP | 11052501 A | * | 2/1999 | | G03B/35/00 |

* cited by examiner

Primary Examiner—Charles H. Nolan, Jr.
(74) Attorney, Agent, or Firm—Jeffrey Weiss; Harry M. Weiss; Weiss, Moy & Harris, P.C.

(57) ABSTRACT

A method for creating a composite work of fine art that is the combination of two works of fine art. The creation of the first and second works of fine art that together form the composite work of fine art each include a hand-painting step. Preferably, for each of the first and second works of fine art, the hand-painting step follows the outputting of its corresponding image onto a substrate. Painting than occurs on top of the image on the substrate, which will speed the process and enhance its accuracy.

37 Claims, 6 Drawing Sheets

METHOD FOR CREATING A WORK OF FINE ART THAT IS A COMPOSITE OF TWO WORKS OF FINE ART

RELATED APPLICATION

This is a continuation-in-part of U.S. patent application Ser. No. 09/649,941, filed Aug. 29, 2000 now U.S. Pat. No. 6,604,873, in the name of the Applicant, and to which priority is claimed.

FIELD OF THE INVENTION

This invention relates generally to the creation of works of art and, more specifically, to a method for creating a work of fine art having the appearance of a single original work of art but that is in fact a composite of two works of art created separately.

BACKGROUND OF THE INVENTION

Works of fine art, including specifically paintings, lithographs, prints, and other print-type works having the appearance of an original or limited edition product, are extremely desirable. They can also be very expensive, depending on the complexity of the work, the artist, and other factors.

Generally, a person who wishes to, for example, commission a professional artist to create an original portrait of a friend or family member can expect to pay a significant fee. The amount of that fee will depend in part on the complexity of the work commissioned. Thus, to the extent that the work includes a particularly complicated scene, the price will be higher. The cost can be prohibitive for most.

Related to the issue of cost is that of time. A complicated work of art can be time consuming for even a professional artist to create. If the piece is to be individualized for a particular customer and is to be a work of fine art, generally only one original will be created. While an original work can be copied as fine art prints using lithographic, giclee or other techniques, such copying does not permit the alteration of the original work in a manner to suit individual customers.

One particular application of the method of the present invention is in the area of sports illustration. In particular, it has been found desirable to provide a hand-painted image of a famous athlete, with a background image comprising a crowd of spectators, most or all of whom are also hand-painted utilizing the method of the present invention. In order to be able to generate such images in a time-effective manner, so that they may be provided to a customer in a relatively short period of time, some additional method steps are preferred.

A need therefore existed for a method that would permit the creation of a fine work of art that is a composite of a hand-painted images created at different times, merged together, and then out-putted to have the appearance of a single hand-painted work. The method should permit the generation of such a work in a time-effective manner.

The present invention satisfies these needs, and provides other, related, advantages.

SUMMARY OF THE INVENTION

An object of the present invention is to provide a method for creating a work of fine art that is a composite of two separate works of hand-painted art, and wherein the composite work has the appearance of a single, hand-painted work of fine art.

A further object of the present invention is to provide a method for creating a composite work having the appearance of a single, hand-painted work of fine art, in a time-effective manner.

A still further object of the present invention is to provide a method for creating a composite work having the appearance of a single, hand-painted work of fine art, consisting of a depiction of an individual in a foreground of such a work, and of a plurality of other individuals in a background of such a work.

BRIEF DESCRIPTION OF THE DRAWINGS

FIG. 1 shows a photographic composite image, with a famous individual in the foreground and a plurality of individuals in the background, printed on plain paper, or the like.

FIG. 2 shows the photographic composite image of FIG. 1, printed on canvas, or the like.

FIG. 3 shows a hand-painted composite image, with a famous individual in the foreground and a plurality of individuals in the background, printed on canvas, or the like.

FIG. 5 shows a photograph of an individual, printed on plain paper or the like, that is later to be inserted into the background portion of the composite image.

FIG. 6 shows the photograph of FIG. 6 printed on canvas, or the like.

FIG. 7 depicts the painting over of the image of FIG. 6.

DETAILED DESCRIPTION OF THE PREFERRED EMBODIMENTS

The present invention is directed to a method for creating a fine art work that is a composite of two separate works, wherein the creation of each separate work involves a hand drawing or painting step. The term "fine art work" or "fine work of art" is meant to refer to visual works having the appearance of an original painting, a lithograph, or limited edition print. The term is meant to distinguish works having the appearance of a photograph, photocopy, or mass-produced poster. In essence, the present invention is directed to a method for editing paintings, as opposed to photographic images.

Figure 8:
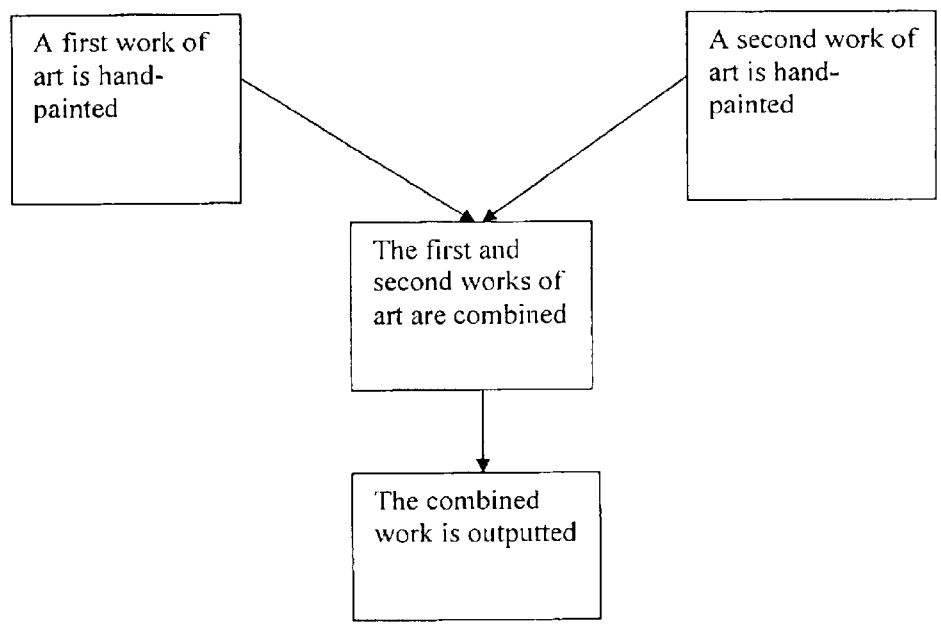
FIG. 8 is a flow chart illustrating basic steps in an embodiment of a method consistent with the present invention.

In particular, the method of the present invention is concerned with: (a) creating a first work of art, wherein the process of creating that first work of art includes a hand-painting step; (b) creating a second work of art, wherein the process of creating that first work of art includes a hand-painting step; (c) combining the first and second works of art; and (d) outputting the combined work. These basic elements are shown in the flow chart of FIG. 8.

The remaining drawing figures are concerned with describing in a more specific way embodiments of a method, consistent with the present invention, for creating and out-putting the combined work. Those various embodiments will now be described, with reference to FIGS. 1–7 and 9–10.

1. Creation of the First Work of Art

Figure 1:

The term "first work of art" as used herein denotes a work that is to have inserted into it the "second work of art." However, the terms "first" and "second" are not chronological, and either work may be created first in time. Generally, it will be preferred to create the "first work of art" before creating the second, for a variety of reasons. For example, where the first work is created earlier, it may be utilized to show potential customers the work of art into which their image (or the image of some other person or perhaps other object of their choosing) can be inserted. FIG. 1 is an example of a first work of art.

Figure 3:

There are several possible ways of creating the first work of art. The creation of the first work of art can begin with the photographing of an image, such as that of a famous athlete in front of a crowd of seated fans, as shown in FIG. 1. Alternatively, the creation of the first work of can begin with the compositing together of materials, such as photographs, that are to form the image, and then photographing the composite image. For example, the composited materials could include photographs of individual background figures for the crowd depicted in FIG. 1, which could be composited together with an image of a foreground figure and perhaps some other background figures to create a composite image having the appearance of FIG. 1. (The compositing step can be performed by hand, or with the assistance of a computer.) As an additional alternative, an artist can hand draw the first work of art from a viewing of an image, using traditional art techniques. FIG. 3 is an example of an image created in this manner.

However the image that will become the first work of art is originally captured, it will be placed on a substrate for subsequent processing steps. The term substrate refers to a desired material upon which an artist may hand-paint an image, such as canvas or other desired material. Where the creation of the first work began with the photographing of an image (whether a single photograph or a compositing of a plurality of photographs), that image is preferably digitized, and is then outputted, for example with an inkjet printer, onto the substrate. (The printing of the image could also be accomplished through a silkscreen process, a photo enlargement process, or other processes.) (Depending on the size of the image, it may be preferable to utilize a large format ink jet printer, or a large format photo enlargment process.)

Figure 2:

FIG. 2 shows the image of FIG. 1 outputted onto a canvas-type of substrate, as indicated by the cross-hatching on FIG. 2. Where the creation began with hand-drawing/painting, the next step depends on the surface onto which the drawing/painting occurred. If it was on suitable substrate material, then no further transfer is required. If not (for example, if the image was drawn onto paper), the image should be scanned and then outputted onto a suitable substrate.

Once the image is on the substrate (and assuming it was not painted thereon), it should be "fixed" thereto with spray fix (or the like) to insure that the image will not bleed while paint is applied to it, creating a barrier between the image and the paint. If the image is outputted using photographic means, it usually requires that the image be coated with a substance such as matte medium, which should be airbrushed, rollered or hand brushed onto the photographic substrate. It should be noted that other methods of fixation may be employed. It should be noted further that, while fixing may be preferred, it is not a required step.

Figure 4:
FIG. 4 shows the painting on top of an individual photographic image from the composite image of FIG. 1.

After fixing the image, the artist begins the application of paint to the image. The underlying photographic image serves as the "drawing" on top of which the resulting painting is created, using any number of artistic mediums such as oil paint, acrylic, watercolor, etc. FIG. 4 illustrates the painting over an image that has been printed onto a suitable substrate, and represents a painted over version of the images depicted in FIGS. 1 and 2.

It should be noted that the painting over an image by no means eliminates the need for artistic talent, or the room for artistic interpretation. A person lacking in artistic skill cannot paint over a photographed image and be able to create an image that will look realistic and accurate. On the other hand, an artist engaged in such process can subtly alter the image that is created, for example by eliminating wrinkles, slimming the face, altering facial features, or the like.

The next step is to digitize the painted first work of art. This may be accomplished in a number of different ways. For example, digitizing can be accomplished using a high end scanner, creating a digital file that can be viewed and adjusted on the computer. Alternatively, the painted image can be captured by a digital camera, and saved as a digital file that can be viewed and adjusted on the computer. (Although it is not necessary, where a digital camera is used, it is preferred to use a high resolution digital camera.) Still further, it would be possible to photograph the painted image using a film camera, usually in a 4×5 or 8×10 format and outputting the image as a transparency, which can then be scanned into a computer to create a digital file. However created, the file should then be proofed, edited and color corrected to accurately reflect the original painting.

2. Creation of the Second Work of Art

Figures 5, 6, 7:
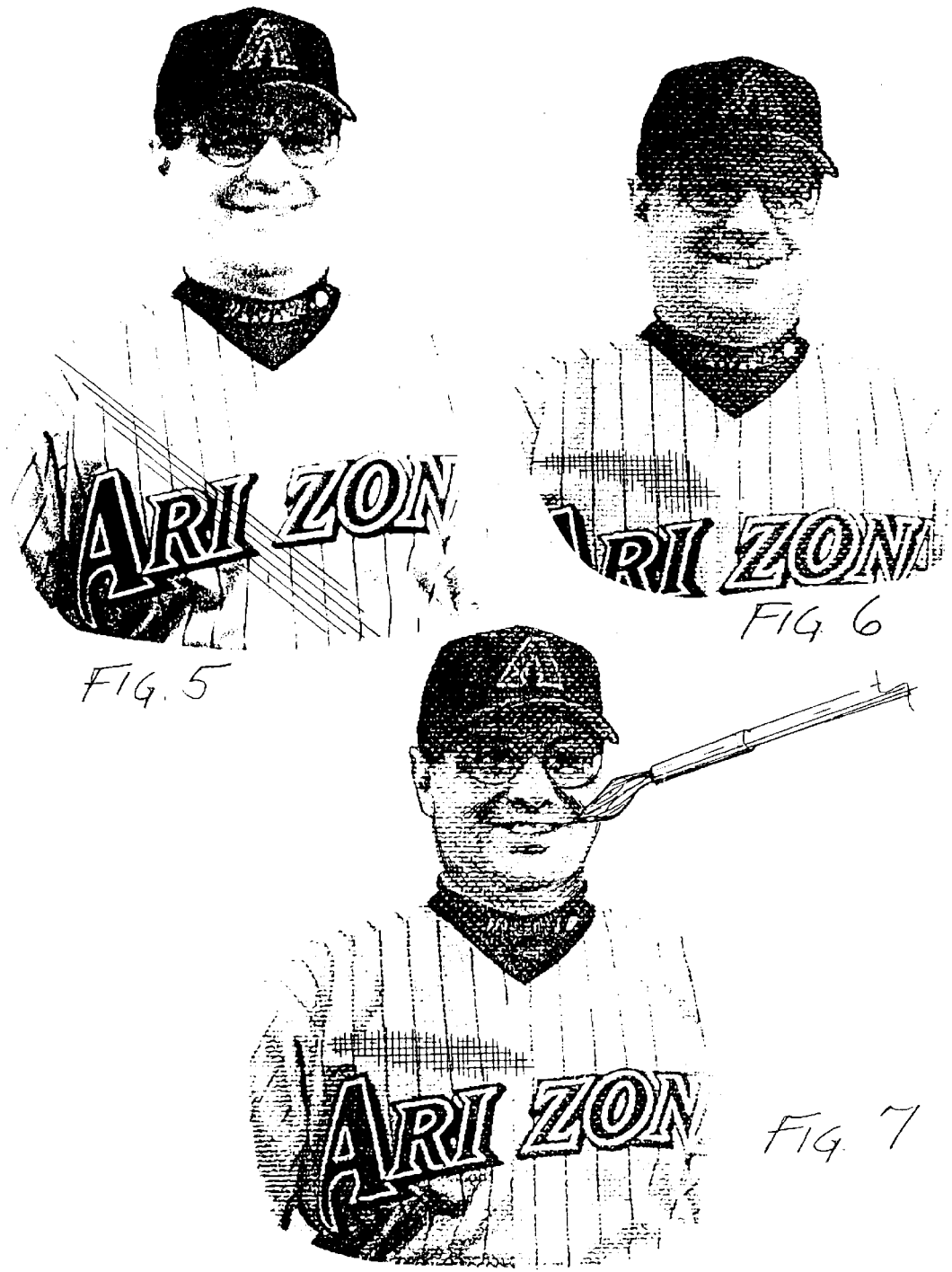

The preferred method for creating the second work of art preferably begins with a digital photograph of the second work of art subject, such as a person, against a solid background color. The solid background color can be any desired color, with blue or green screen being possible, though not the only, choices. (FIG. 5 provides an example of a photograph of a second work of art subject.) It should be emphasized that the subject of the second work of art need not be a person, and can be any desired object, including for example an animal, an object, a name on a sign, etc.

When taking the photograph, it is preferred to use similar lighting to that of the first work of art, so as to create a more uniform look for the third work of art that will be a composite of the first and second works of art. The use of a solid background color such as blue or green screen allows for the use of computer software such as Cinematte, Ultimatte, or the like to quickly and easily cut out the second work of art subject from the background. The second work of art is then saved as a computer file.

It should be noted that the second work of art could also be created in other ways. For example, a film rather than a digital camera could be used to capture the image of the subject of the second work of art. (Indeed, the second work of art could be a pre-existing film photograph taken at an earlier time and perhaps without the intent that it be used to create a composite work of art as described herein.) In such instance, the developed image should be scanned into a computer in order to create a digital file.

As the processing of preparing the composite work of art proceeds, it will be preferred to provide a copy of the photograph as a reference for the artist for subsequent steps in the process. For example, utilizing an inkjet printer, the photograph can be printed on photo quality paper using an inkjet printer.

The next step is to paint the second work of art. Where the creation of the second work of art includes the step of photographing the subject of the second work of art, the painting process requires the outputting of the second work of art onto a suitable substrate for subsequent processing steps. FIG. 6 illustrates the image of FIG. 5 after outputting to a canvas-type of substrate. (it should be noted that the substrate onto which the second work of art is to be outputted could be a physically separate substrate from that onto which the first work of art has been outputted, or could be a space on the substrate for the first work of art.)

Where the creation of the second work of art has included the step of creating a digital photograph of the second work of art against a solid background color, the subject's image should be stripped out of its background using either a program such as Cinematte or Ultimatte. If the background is not of a solid color, the subject's image can be stripped out by hand using a program such as Adobe Photoshop or with a program such as Knockout. The stripping out can even be a manual process, such as a cutting out or painting over of a background. Other methods may also be employed.

The photograph should then be pasted into a new window, preferably with a background (white or transparent backgrounds, or indeed other colored backgrounds may be utilized), and outputted using an inkjet printer (or printed photographically) onto the preferred same substrate as the original painting into which the new portrait is to be integrated. (It should be noted that the removal of the background need not occur at this point but should, preferably, occur by the step of combining the first and second works.) If necessary, the image on the substrate is fixed as described above, and the artist can then paint on top of the outputted image, as illustrated in FIG. 7. This painting step preferably utilizes the same technique and medium as described above for the first work of art that is to be combined with the second work of art. It is preferable that the second work of art have like characteristics to the first work of art with regard to color scheme, painting style and texture.

If the second work of art is to be drawn directly on the substrate as opposed to being painted on top of a photographic image, a photo of the client's image is either hand drawn onto the substrate, or is projected onto the substrate using an opaque projector and then drawn. (Another possibility would be to hand draw the image onto another substrate, and then print or transfer that image to the desired substrate.)

At this point, the second work of art should be digitized, for example utilizing any of the methods described above with respect to the digitizing of the painted first work of art.

3. Combination of the First and Second Works of Art

The digitized, painted second work of art should be separated from either its solid background color or white background. This can be accomplished, by way of example, through the use of a specialized computer program such as Cinematte or Ultimatte, or through the use of tools found in programs such as Adobe Photoshop such as the magic wand or the color range tool. The image is then copied or cut and then pasted into the digital version of the original painting.

The second work art is then preferably conformed to the first work of art. This can be accomplished, by way of example, using a variety of digital processing tools found in programs such as Adobe Photoshop. The resulting new image, now the third work of art, should then be saved as a file.

Figure 9:
FIG. 9 shows a portion of a hand-painted composite image, with the image of FIG. 6 therein.
Figure 10:
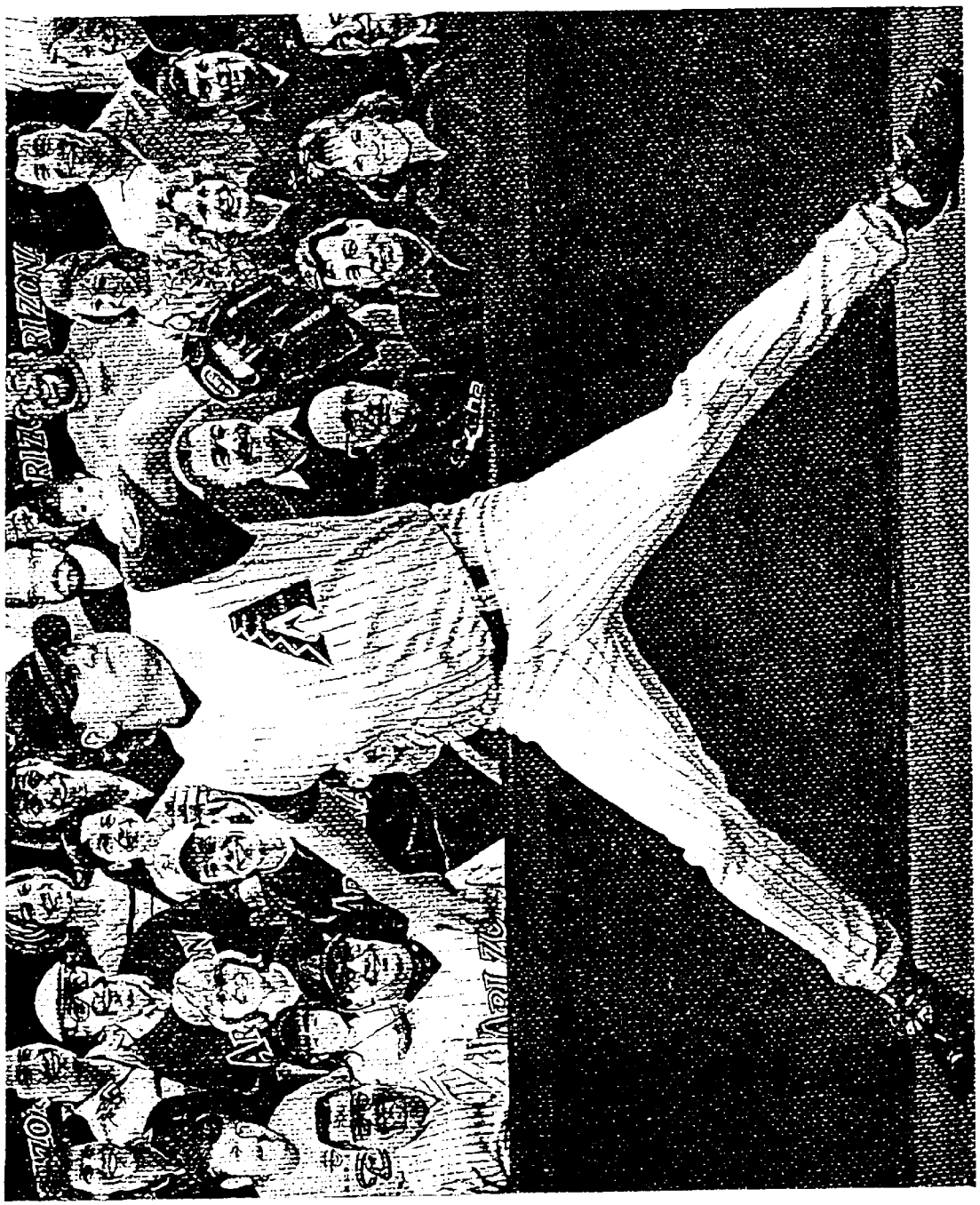
FIG. 10 shows the full hand-painted composite image of FIG. 8.

The next step is preferably to output the third work of art to a printing device. This can be large format inkjet printer such as an Iris, Roland, Epson or similar printer—though, of course, a standard size inkjet printer could be utilized depending on the size of the third work of art. (Alternatively, outputting may be to an offset lithographic press, or to a specialized lithographic press that is able to change its plates through electrostatic methods, enabling custom images to be printed without having to stop the press and change plates.) The image may be outputted to a variety of substrates including, but not limited to archival art papers or canvas. (It is preferred that the ink set used have archival qualities.) FIG. 9 shows a portion of a composite third work of art, and FIG. 10 shows a fuller image of the third work of art. It can be seen that the third work of art has elements of the first work of art (see, e.g., FIGS. 1 and 2) and the second work of art (see. e.g., FIG. 7) therein.

Although not required, the resulting image may then be coated via silkscreen with a protective ultraviolet inhibitor clear coat to add additional archival protection for the image, as well as to give the image a deeper, richer, higher quality appearance. Preferably, the image is then signed and numbered by the artist.

It should be noted that, while in one embodiment, the third work of art is outputted as a print or the like onto a canvas or similar substrate, the third work of art may be outputted onto other things. For example, the method described herein may be utilized to create custom trading cards, custom greeting cards, custom photo albums, custom children's books, custom t-shirts, custom puzzles, or another product utilizing imagery.

I claim:

1. A method for creating a composite work of fine art comprising the steps of:

hand-painting a first work of fine art;
wherein said step of hand-painting said first work of fine art includes the steps of:
photographing a first image to create a photograph of said first image;
digitizing said photograph of said first image to create a first digital image;
outputting said first digital image on a first substrate;
applying paint to said first digital image on said first substrate to create a first painted image;
digitizing said first painted image;
importing said digitized first painted image into an image editing computer software program;
hand-painting a second work of fine art;
wherein said step of hand-painting said second work of fine art includes the steps of:
photographing a second image to create a photograph of said second image;
digitizing said photograph of said second image to create a second digital image;
outputting said second digital image on a second substrate;
applying paint to said second digital image on said substrate to create a second painted image;
digitizing said second painted image;
importing said digitized second painted image into an image editing computer software program;
using said image editing computer software program to paste said digitized second painted image into said digitized first painted image to create a third work of fine art having the appearance of a single, hand-painted work of art; and
printing said third work of fine art.

2. The method of claim 1 further comprising the step of fixing said first digital image to said first substrate.

3. The method of claim 2 wherein said fixing is accomplished by coating said first digital image with matte medium.

4. The method of claim 1 further comprising the step of fixing said second digital image to said second substrate.

5. The method of claim 4 wherein said fixing is accomplished by coating said first digital image with matte medium.

6. The method of claim 2 further comprising the step of fixing said second digital image to said second substrate.

7. The method of claim 1 wherein said step of photographing a first image to create a photograph of said first image further comprises the step, prior to said step of photographing said first image, of compositing together materials that are to form said first image.

8. The method of claim 7 wherein said materials are a plurality of photographs.

9. The method of claim 1 wherein said first image is of a person in a foreground portion of said first image and a plurality of persons in a background portion of said first image, wherein said second image is of a person, and wherein during said importing step said second image is inserted into said background portion of said first image to form said third work of fine art.

10. The method of claim 8 wherein said first image is of a person in a foreground portion of said first image and a plurality of persons in a background portion of said first image, wherein said second image is of a person, and wherein during said importing step said second image is inserted into said background portion of said first image to form said third work of fine art.

11. The method of claim 1 wherein said first substrate is a canvas.

12. The method of claim 1 wherein said second substrate is a canvas.

13. The method of claim 1 wherein said step of outputting said first digital image on a first substrate is accomplished utilizing an inkjet printer.

14. The method of claim 1 wherein said step of outputting said first digital image on a first substrate is accomplished utilizing a silkscreen process.

15. The method of claim 1 wherein said step of outputting said first digital image on a first substrate is accomplished utilizing a photo enlargement process.

16. The method of claim 1 wherein said step of digitizing said photograph of said first image to create a first digital image comprises the step of scanning said photograph of said first image.

17. The method of claim 1 wherein said step of digitizing said photograph of said first image to create a first digital image comprises the step of capturing said photograph of said first image with a digital camera.

18. The method of claim 1 wherein said step of photographing said second image further comprises the step of photographing said second image against a solid background color wherein said solid background color is one of blue screen and green screen.

19. The method of claim 18 further comprising the step of cutting out said second image from said solid background color.

20. The method of claim 1 wherein said step of outputting said second digital image on a second substrate is accomplished utilizing an inkjet printer.

21. The method of claim 1 wherein said step of outputting said second digital image on a second substrate is accomplished utilizing a silkscreen process.

22. The method of claim 1 wherein said step of outputting said second digital image on a second substrate is accomplished utilizing a photo enlargement process.

23. The method of claim 1 wherein said step of digitizing said photograph of said second image to create a second digital image comprises the step of scanning said photograph of said second image.

24. The method of claim 1 wherein said step of digitizing said photograph of said second image to create a second digital image comprises the step of capturing said photograph of said second image with a digital camera.

25. The method of claim 1 wherein said step of printing said third work of art is accomplished using an inkjet printer.

26. The method of claim 1 wherein said step of printing said third work of all is accomplished using a lithographic press.

27. The method of claim 1 further comprising the step of coating said third work of fine art with a protective ultraviolet inhibitor clear coat.

28. The method of claim 1 wherein said step of printing said third work of art further comprises the step of printing said third work of art onto a canvas.

29. The method of claim 1 further comprising the step of incorporating said third work of fine art into a trading card.

30. The method of claim 1 further comprising the step of incorporating said third work of fine art into a greeting card.

31. The method of claim 1 further comprising the step of incorporating said third work of fine art into a photo album.

32. The method of claim 1 further comprising the step of incorporating said third work of fine art into a book.

33. The method of claim 1 further comprising the step of incorporating said third work of fine art into a shirt.

34. The method of claim 1 further comprising the step of incorporating said third work of fine art into a puzzle.

35. The method of claim 1 wherein said first substrate and said second substrate are separated one from the other.

36. The method of claim 1 wherein said second substrate comprises a portion of said first substrate.

37. A method for creating a composite work of fine art comprising the steps of:
  hand-painting a first work of fine art;
  wherein said step of hand-painting said first work of fine art includes the steps of:
    photographing a first image to create a photograph of said first image;
    digitizing said photograph of said first image to create a first digital image;
    outputting said first digital image on a first substrate;
  applying paint to said first digital image on said first substrate to create a first painted image;
  digitizing said first painted image;
  importing said digitized first painted image into an image editing computer software program;
  hand-painting a second work of fine art;
  wherein said step of hand-painting said second work of fine art includes the steps of:
    photographing a second image to create a photograph of said second image against a solid background color wherein said solid background color is one of blue screen and green screen;
    digitizing said photograph of said second image to create a second digital image;
    outputting said second digital image on a second substrate;
    applying paint to said second digital image on said substrate to create a second painted image;

digitizing said second painted image;

importing said digitized second painted image into an image editing computer software program;

using said image editing computer software program to paste said digitized second painted image into said digitized first painted image to create a third work of fine art having the appearance of a single, hand-painted work of art; and printing said third work of fine art;

wherein said first image is of a person in a foreground portion of said first image and a plurality of persons in a background portion of said first image, wherein said second image is of a person, and wherein during said importing step said second image is inserted into said background portion of said first image to create said third work of fine art.

* * * * *